July 11, 1961
R. I. McCLURE
2,992,041
AUTOMOBILE
Filed Jan. 14, 1959
3 Sheets-Sheet 1
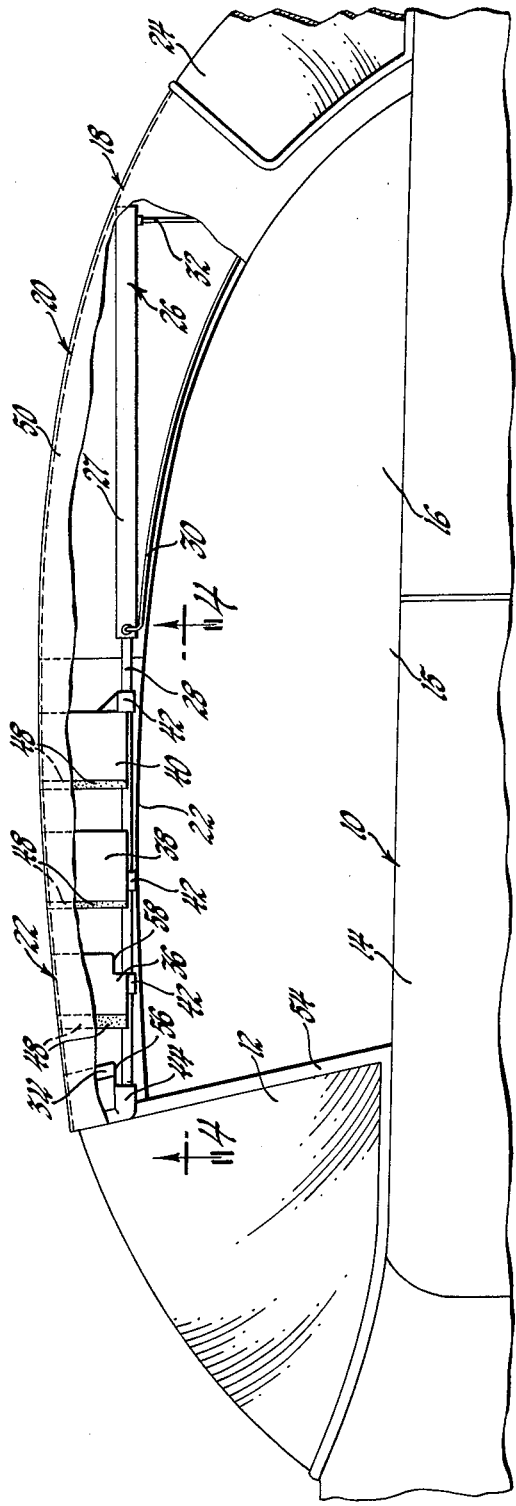
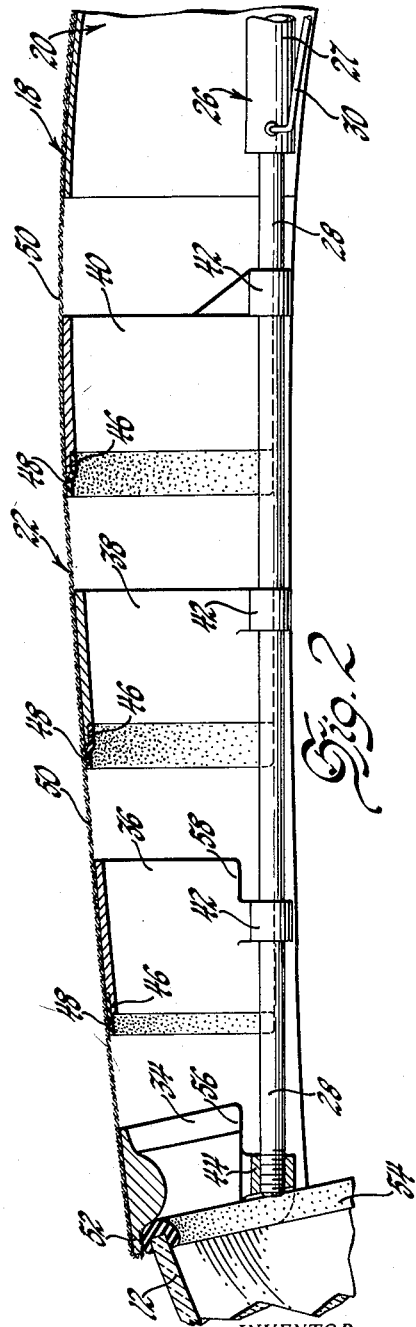
INVENTOR.
Robert I. McClure
BY
Herbert Furman
ATTORNEY July 11, 1961  R. I. McCLURE  2,992,041
AUTOMOBILE
Filed Jan. 14, 1959  3 Sheets-Sheet 2
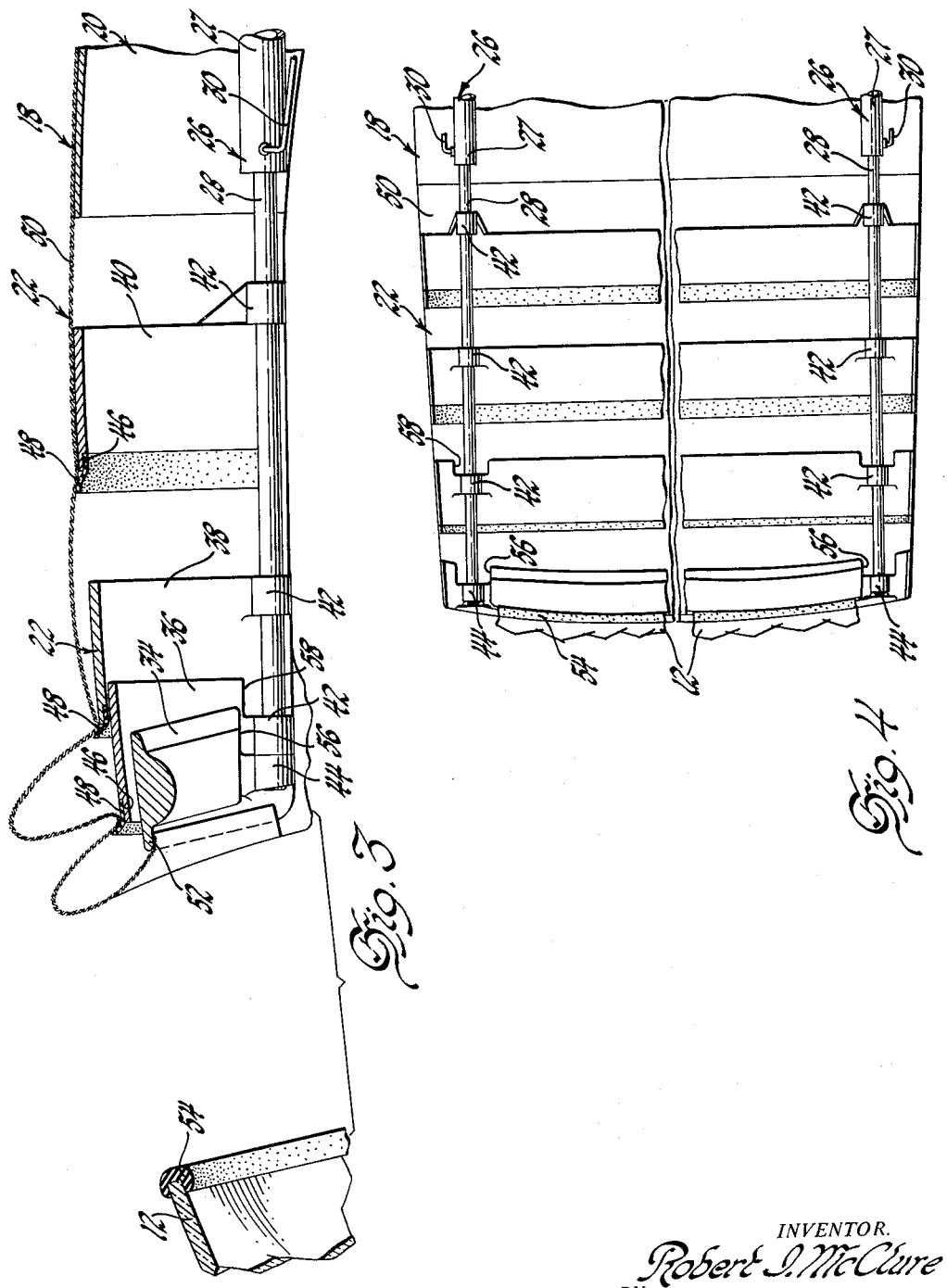
INVENTOR.
Robert I. McClure
BY
Herbert Furman
ATTORNEY July 11, 1961 R. I. McCLURE 2,992,041
AUTOMOBILE
Filed Jan. 14, 1959 3 Sheets-Sheet 3

INVENTOR.
Robert I. McClure
BY
Herbert Furman
ATTORNEY

United States Patent Office
2,992,041
Patented July 11, 1961

2,992,041
AUTOMOBILE
Robert I. McClure, Warren, Mich., assignor to General Motors Corporation, Detroit, Mich., a corporation of Delaware
Filed Jan. 14, 1959, Ser. No. 786,723
2 Claims. (Cl. 296—117)

This invention relates to an automobile and more particularly to a top structure for an automobile.

The top structure of this invention generally includes a rear rigid top section and a forward foldable top section to thereby allow the driver or passenger to uncover the forward portion of the passenger compartment whenever desired without having to raise and lower the entire top structure. Thus, the top structure of this invention offers several advantages over present automobile foldable type top structures. In the present convertible type automobile top structure, the foldable top frame must either be located in an entirely raised or in an entirely lowered position and cannot remain in any intermediate position. Likewise, in the present foldable hardtop type of automobile top structure, the top must either be in an entirely raised or in an entirely lowered position.

In the top structure of this invention, the rear rigid section may either be fixed with respect to the body or may be movable relative thereto between raised and lowered positions. The foldable forward section of the top structure is supported by the rear section and may either be extended over the forward portion of the passenger compartment or retracted with respect thereto. If the rear section is mounted on the body for movement relative thereto between raised and lowered positions, the forward section can be stored within the body within the rear section when the rear section is in a lowered position and likewise can only be extended and retracted with respect to the rear section when the rear section is in a raised position.

The primary object of this invention is to provide an improved vehicle top structure. Another object of this invention is to provide an improved vehicle top structure which includes a rigid section and a foldable section movable between extended and retracted positions with respect to the fixed section to open and close a portion of the vehicle passenger compartment.

These and other objects of the invention will be readily apparent from the following specification and drawings, wherein:

FIGURE 1 is a partial side elevational view of a vehicle body embodying a top structure according to this invention, with portions thereof broken away for clarity of illustration;

FIGURE 2 is a an enlarged view of a portion of FIGURE 1 showing the forward section in extended position;

FIGURE 3 is a view similar to FIGURE 2 showing the forward foldable section in a partially retracted position;

FIGURE 4 is a view taken along the plane indicated generally by line 4—4 of FIGURE 1.

Figure 5:
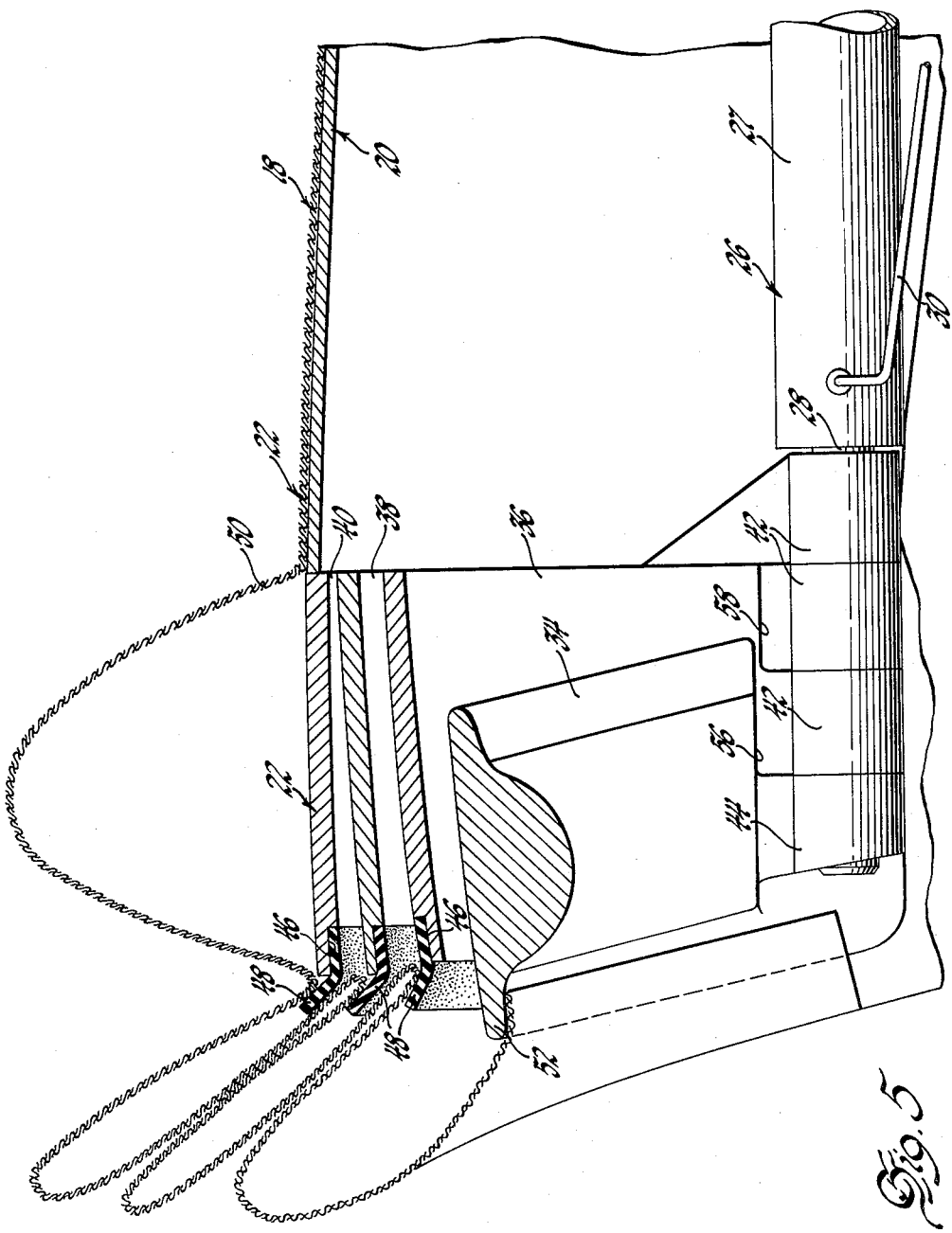
FIGURE 5 is an enlarged view showing the forward section in a completely retracted position.

Referring now particularly to FIGURE 1 of the drawings, a vehicle body 10 includes a windshield 12 fixedly mounted thereon and a pair of front doors 14 movable to open and closed positions to provide access to and exit from the forward portion 15 of the passenger compartment 16 of the body. The passenger compartment 16 is covered by a top structure 18 according to this invention which generally includes a longitudinally and transversely curved rear rigid section 20 following the normal curvature of the roof of a vehicle body and a forward extendable and retractable foldable section 22. The section 20 may either be fixedly mounted on the body or may be mounted thereon in a suitable manner for movement between a normal raised position and a lowered position wherein the section 20 is stored within a storage well located to the rear of the passenger compartment 16, as is well known. The section 20 includes the vehicle backlite 24.

A pair of actuators 26 are fixedly secured to the section 20 in a suitable manner, one of the actuators being provided on each side of the section 20, as can be seen in FIGURE 4 of the drawings. Each of the actuators generally includes a fixed cylinder 27 and a piston rod 28 which is extendable and retractable with respect to the cylinder. Pressure fluid conduits 30 and 32 connect the forward and rearward ends, respectively, of the cylinders with a source of pressure fluid, either positive or negative, to provide for reciprocation of the pistons, not shown, within the cylinder to thereby extend and retract the piston rods 28, which are fixed to the pistons. Of course, a suitable control is provided within the passenger compartment 16 to provide for remote actuation of the power actuators.

A plurality of transverse bows 34, 36, 38 and 40 are supported at each end thereof on the piston rods 28. Bows 36, 38 and 40 each comprise a longitudinally and transversely curved metal or plastic member which follows the normal curvature of the roof of a vehicle body, with the member being provided with apertured bosses 42 at each end thereof slidably mounted on the piston rods 28. The forward bow 34 is also comprised of a metal member curved to follow the normal curvature of the roof of a vehicle body, with the forward ends of each of the piston rods 28 being threaded into threaded bosses 44 provided at each end of the bow, as shown in FIGURE 2, to fixedly secure the forward bow 34 to the piston rods.

Bows 36, 38 and 40 are each provided with a longitudinal groove 46 at the forward edge thereof, with the grooves 46 of bows 38 and 40 opening downwardly and the groove 46 of bow 36 opening upwardly, with respect to the vehicle body. A flexible strip 48 of rubber or plastic has an edge portion thereof received in each of the grooves 46 and secured thereto in a suitable manner, such as by cementing or riveting or otherwise. The flexible strips 48 extend the full longitudinal length of each of the bows, from one side of the bow to the other. The free edge portions of the strips are normally biased upwardly with respect to the bows, the free positions of the strips being shown in FIGURE 5, for a purpose to be explained. A convertible top fabric 50 covers the rigid section 20, being secured thereto in a suitable manner, and extends forwardly to the bow 34, being wrapped around the forward edge 52 of the bow and secured to the under side of this edge in a suitable manner, as by cementing. The fabric 50 is also secured to the free edge portions only of each of the flexible strips 48 in a suitable manner such as by stitching or cementing.

When the section 22 is in an extended position, as shown in FIGURE 1 of the drawings, it can be seen that the top fabric completely covers the rear section 20 and is stretched taut between the rear section and the forward bow 34 whereby the vehicle appears as a conventional hardtop sedan.

It will be remembered that the only connection between the top fabric 50 and the bows 36, 38 and 40 is at the free edge portions of the flexible strips 48 secured to these bows. Thus, when the top fabric is stretched taut between the rear section 20 and bow 34, the top fabric itself accurately locates the bows 36, 38 and 40 in position on the piston rods 28 between the rear section 20 and bow 34. It will further be remembered that the free edge portions of the strips 48 are normally biased in an upward direction with respect to the bows, the free position of these strips being shown in FIGURE 5. The tension in the top fabric when section 22 is in an extended position causes the free edge portions of the strips 48 to be held downwardly with respect to the bows so that these free edge portions lie in the same plane as the outer surfaces of the bows 36, 38 and 40. Since the bows are rather wide when compared to the width of the usual foldable convertible top frame bow, there are no noticeable lines or bulges in the top fabric 50 between the rigid section 20 and bow 34. Although not shown in the drawings, suitable latches may be provided to latch bow 34 to the windshield frame 54.

When it is desired to open the forward portion 15 of the passenger compartment, the header latches, if any, are released and positive pressure fluid is supplied through conduits 30 to the forward ends of cylinders 27 to thereby retract each of the piston rods 28 within the cylinders, conduits 32 being connected to a reservoir or sump. As the piston rods are retracted, bow 34 is moved rearwardly of the body to release the tension in the top fabric 50 and move the other bows 36, 38 and 40 rearwardly, as will now be described with particular reference to FIGURES 3, 4, and 5 of the drawings. As shown in FIGURE 3, a portion of bow 34 is cut away at 56 at each side thereof rearwardly of bosses 44 so that the bosses engage the bosses 42 of bow 36 when bow 34 is moved rearwardly within and underneath bow 36 to locate the bows in internested position and reduce the internested overall width of the bows.

This movement of bow 34 causes the top fabric to fold between bows 34 and 36, and the release of the tension in the top fabric permits the flexible strip 48 of bow 36 to move to its free position to ensure the upward folding of the top fabric between bows 34 and 36 and prevent pinching of the fabric between the bows.

Upon further rearward movement of bows 34 and 36 as a unit, the bows will move within and underneath bow 38, and the bosses 42 of bow 36 will engage the bosses 42 of bow 38, bow 36 being cut away at 58 at each side thereof to permit this engagement of the bosses. The flexible strips 48 of bows 36 and 38 ensure that the top fabric 50 will fold upwardly when bows 36 and 38 are internested since they move to their position upon movement of bow 36 toward bow 38.

Upon further rearward movement of bows 34, 36 and 38 as a unit, the bows will move within and underneath bow 40 and the bosses 42 of bow 38 will engage the bosses 42 of bow 40 to thereby locate bows 34, 36, and 38 in their internested position with respect to bow 40 to locate all of the bows, in a completely internested position immediately forward of and adjacent the forward edge of the rigid section 20 of the top 18.

Again the flexible strips 48 of bows 38 and 40 will insure that the top fabric 50 will fold upwardly with respect to these bows when the bows move to their internested position, since the strips 48 can move to their free position upon movement of bows 38 and 40 relative to each other. Thereafter upon continued rearward movement of all of the bows as a unit, the rearward edge of bow 40 will engage the forward edge of the rigid section 20, as shown in FIGURE 5, to move the top section 22 to a completely retracted position with respect to the section 20, the strip 48 of bow 40 insuring that the top fabric between the strip and section 20 will move upwardly so as not to be pinched.

The cutouts provided in bows 34, 36 and 38 at either side thereof rearwardly of the bosses 44 and 42 permit the bosses to interengage to move the bows to an internested position and also appreciably reduce the overall internested width of the bows.

It will further be noted that the bosses 44 and 42 are particularly located on their respective bows in order to insure the minimum possible overall internested width of the bows. Thus, bosses 44 of bow 34 are located adjacent the forward edge of this bow, bosses 42 of bow 36 are located approximately intermediate the forward and rearward edges of this bow, bosses 42 of bow 38 are located at the rearward edge of the bow, and bosses 42 of bow 40 are located rearwardly of the rearward edge of the bow so as to fit beneath the forward edge portion of the rigid top section 20 when section 22 is retracted. Additionally, the use of the flexible strips 48 on bows 36, 38 and 40 insures that the top fabric 50 between the successive pairs of bows and between bow 40 and section 20 will fold upwardly when the bows are internested and moved to their completely retracted position to thereby prevent any damage to the fabric which could be caused by the fabric either partially or completely folding between the successive pairs of bows or between bow 40 and the forward edge of section 20 when the section 22 is retracted.

If it is desired to move the section 22 of the top to an extended position, pressure fluid is applied to the cylinders through conduits 32, conduits 30 being connected to the reservoir or sump, to move bow 34 forwardly to its position of FIGURES 1 and 2. This movement of bow 34 will cause the top fabric to be tensioned between bow 34 and section 22 to locate the bows 36, 38, and 40 along the piston rods 28, and to move strips 48 to their planar position with respect to the upper surfaces of the bows 36, 38, and 40.

Of course, if negative pressure fluid is used, then conduit 32 will be connected to the source of fluid and conduit 30 opened to the atmosphere to retract the section 22, and conduit 30 will be connected to the source of fluid and conduit 32 opened to atmosphere to retract the section.

Thus, this invention provides a new and improved top structure for an automobile which includes a rigid section and a foldable section movable between extended and retracted positions with respect to the rigid section to allow the operator to open and close only a portion of the passenger compartment as desired.

I claim:

1. In combination with a vehicle body having a passenger compartment therein, a top structure comprising, a top section mounted on said body, a pair of power actuators mounted on said top section, each including a power operated extendable and retractable piston rod member, a forward top bow, means securing said forward top bow to the forward ends of each of said members for movement therewith between extended and retracted positions with respect to said top section, a plurality of other top bows, means slidably mounting said other top bows on said rod members between said forward bow and said top section, said other top bows being of successively increasing size with respect to each other and to said forward top bow to permit all of said bows to internest with each other, said securing means being located adjacent the leading edge of said forward top bow and said mounting means being successively spaced away from the leading edge of the top bow respective thereto to allow said securing means and said mounting means to be disposed in successively adjacent relationship when said top bows are internested, a top fabric secured to said top section and to each of said bows, and means for controlling said power actuators to cause said rod members to move said forward bow to extended and retracted positions with respect to said top section, movement of said forward bow to said extended position tensioning said top fabric between said forward bow and said top section to locate said other bows on said rod members between said forward bow and said top section and to cause said fabric to follow the general plane between said bows, movement of said forward bow to a retracted position releasing the tension in said top fabric and causing said bows to internest by engagement of said securing means of said forward bow with said mounting means of said next successive bow and succeeding engagement of said mounting means of said successive bows with each other.

2. In combination with a vehicle body having a passenger compartment therein, a top structure comprising, a top section mounted on said body, a pair of power actuators mounted on said top section, each including a power operated extendable and retractable piston rod member, a forward top bow, means securing said forward top bow to the forward ends of each of said members for movement therewith between extended and retracted positions with respect to said top section, a plurality of other top bows, means slidably mounting said other top bows on said rod members between said forward bow and said top section, a top fabric secured to said top section and to said forward bow, means interconnecting the leading edge portions of said other top bows and said top fabric and normally biasing said fabric to an upwardly folded position between successive pairs of said bows to prevent pinching of said fabric when said bows internest, said other top bows being of successively increasing size with respect to each other and to said forward top bow to permit all of said bows to internest with each other, said securing means being located adjacent the leading edge of said forward top bow and said mounting means being successively spaced away from the leading edge of the top bow respective thereto to allow said securing means and said mounting means to be disposed in successively adjacent relationship when said top bows are internested and means for controlling said power actuators to cause said rod members to move said forward bow to extended and retracted positions with respect to said top section, movement of said forward bow to said extended position tensioning said top fabric between said forward bow and said top section to locate said other bows on said rod members between said forward bow and said top section and overcoming the biasing force of said interconnecting means to cause said fabric to follow the general plane between said bows, movement of said forward bow to a retracted position releasing the tension in said top fabric to allow said interconnecting means to bias said top fabric upwardly as said bows internest by engagement of said securing means of said forward bow with said mounting means of said next successive bow and succeeding engagement of said mounting means of said successive bows with each other.

References Cited in the file of this patent
UNITED STATES PATENTS

| | | |
|---|---|---|
| 1,786,662 | Leather | Dec. 30, 1930 |
| 2,496,437 | Bramble | Feb. 7, 1950 |
| 2,733,954 | Blake | Feb. 7, 1956 |